United States Patent [19]
Bartholomew

[11] Patent Number: 5,868,435
[45] Date of Patent: Feb. 9, 1999

[54] APPARATUS FOR AND METHOD OF ATTACHING CONDUITS TO A FITTING

[75] Inventor: Donald D. Bartholomew, Mt. Clemens, Mich.

[73] Assignee: Proprietary Technology, Inc., Bloomfield Hills, Mich.

[21] Appl. No.: 737,387

[22] Filed: Nov. 6, 1996

Related U.S. Application Data

[60] Continuation-in-part of Ser. No. 776,824, Oct. 15, 1991, Pat. No. 5,388,870, which is a division of Ser. No. 504,543, Apr. 4, 1990, Pat. No. 5,261,706, which is a division of Ser. No. 265,263, Oct. 31, 1988, Pat. No. 4,923,226, which is a continuation-in-part of Ser. No. 189,395, May 2, 1988, abandoned, which is a continuation-in-part of Ser. No. 66,749, Jun. 23, 1987, abandoned.

[51] Int. Cl.⁶ .................................................. F16L 55/00
[52] U.S. Cl. .............................. 285/23; 285/23; 285/93; 285/242; 285/255; 285/906; 29/451; 29/525
[58] Field of Search .............................. 285/93, 242, 23, 285/255, 906; 29/451, 525

[56] References Cited

U.S. PATENT DOCUMENTS

| | | |
|---|---|---|
| 186,855 | 1/1877 | Leland . |
| 756,350 | 4/1904 | Garbutt . |
| 1,181,280 | 5/1916 | Winter . |
| 1,802,499 | 4/1931 | Chapman . |
| 2,253,628 | 8/1941 | Krapp . |
| 3,262,718 | 7/1966 | Draudt . |
| 3,348,863 | 10/1967 | Rinker . |
| 3,361,449 | 1/1968 | Parro . |
| 3,560,028 | 2/1971 | Ohba . |
| 3,695,632 | 10/1972 | Kruse et al. . |
| 3,711,130 | 1/1973 | Betzler . |
| 3,741,238 | 6/1973 | Lacey . |
| 3,799,586 | 3/1974 | Caras et al. . |
| 4,021,061 | 5/1977 | Zimmerman . |
| 4,030,778 | 6/1977 | Kaut, Jr. . |
| 4,178,021 | 12/1979 | Lauro et al. . |
| 4,238,132 | 12/1980 | Palmaer . |
| 4,407,526 | 10/1983 | Cicenas ............................... 285/242 X |
| 4,564,222 | 1/1986 | Loker et al. . |
| 4,577,894 | 3/1986 | Wake . |
| 4,705,304 | 11/1987 | Matsuda et al. . |
| 4,747,626 | 5/1988 | Hama et al. . |
| 4,819,969 | 4/1989 | Williams . |
| 5,261,706 | 11/1993 | Bartholomew . |
| 5,388,870 | 2/1995 | Bartholomew . |
| 5,425,557 | 6/1995 | Bartholomew . |
| 5,524,939 | 6/1996 | Bartholomew . |
| 5,544,923 | 8/1996 | Bartholomew . |
| 5,582,436 | 12/1996 | Bartholomew . |

FOREIGN PATENT DOCUMENTS

| | | |
|---|---|---|
| 210848 | 9/1957 | Australia . |
| 235747 | 10/1959 | Australia ............................... 285/242 |
| 687700 | 4/1930 | France . |
| 271183 | 1/1932 | France . |
| 1085009 | 7/1954 | France . |
| 1092792 | 11/1954 | France . |
| 1211974 | 10/1959 | France . |
| 21 49 136 | 4/1972 | Germany . |
| 27 16 290 | 10/1978 | Germany . |
| 663497 | 5/1964 | Italy ....................................... 285/242 |
| 194818 | 12/1937 | Switzerland . |
| 179318 | 5/1922 | United Kingdom . |
| 445144 | 4/1936 | United Kingdom . |
| 826521 | 1/1960 | United Kingdom . |
| 1065325 | 4/1967 | United Kingdom ................... 285/242 |

*Primary Examiner*—Dave W. Arola
*Attorney, Agent, or Firm*—Harness, Dickey & Pierce

[57] ABSTRACT

A coupling for use with conduits (10) comprise a bi-conical fitting (20) which is inserted into the conduit end, a frusto-conical locking sleeve (22) which is located about the rearward end of the fitting (20) and compressed about the outer wall of the conduit (10).

42 Claims, 7 Drawing Sheets

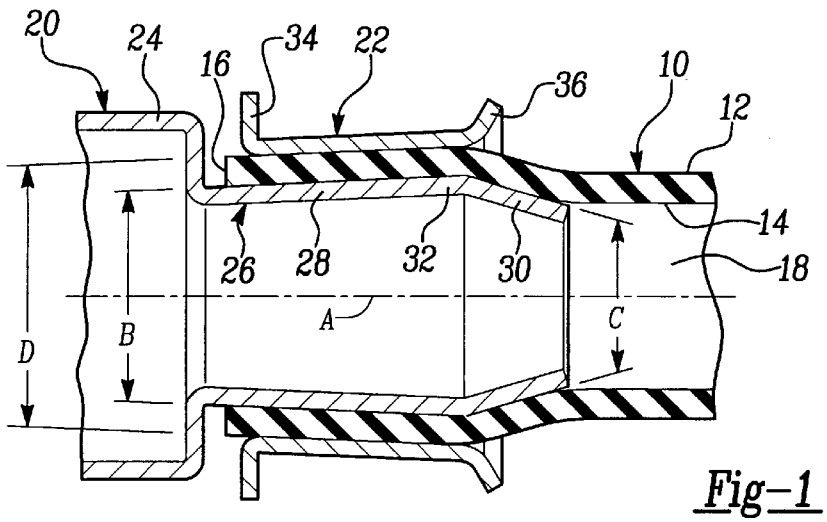
Fig-1
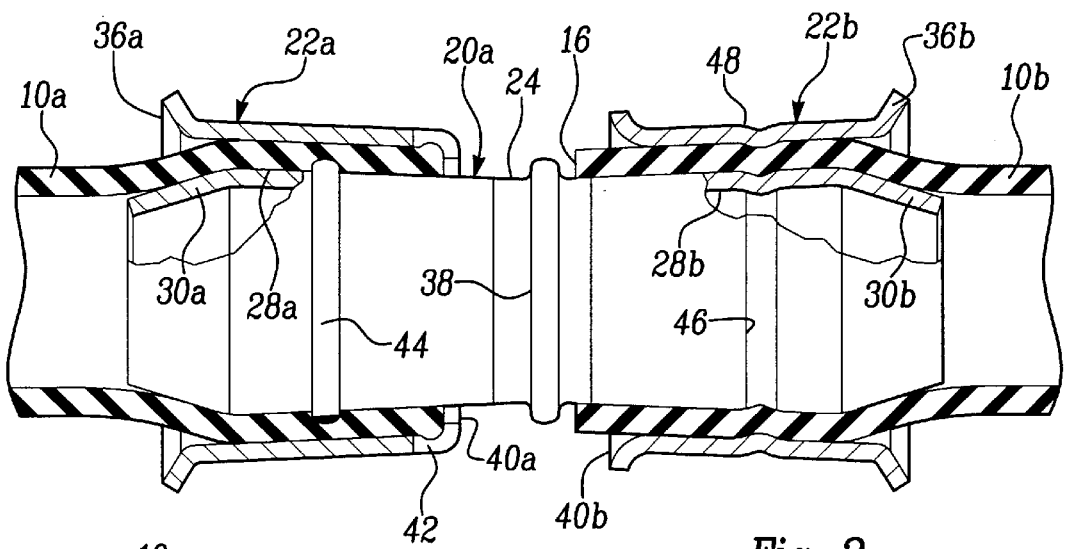
Fig-2
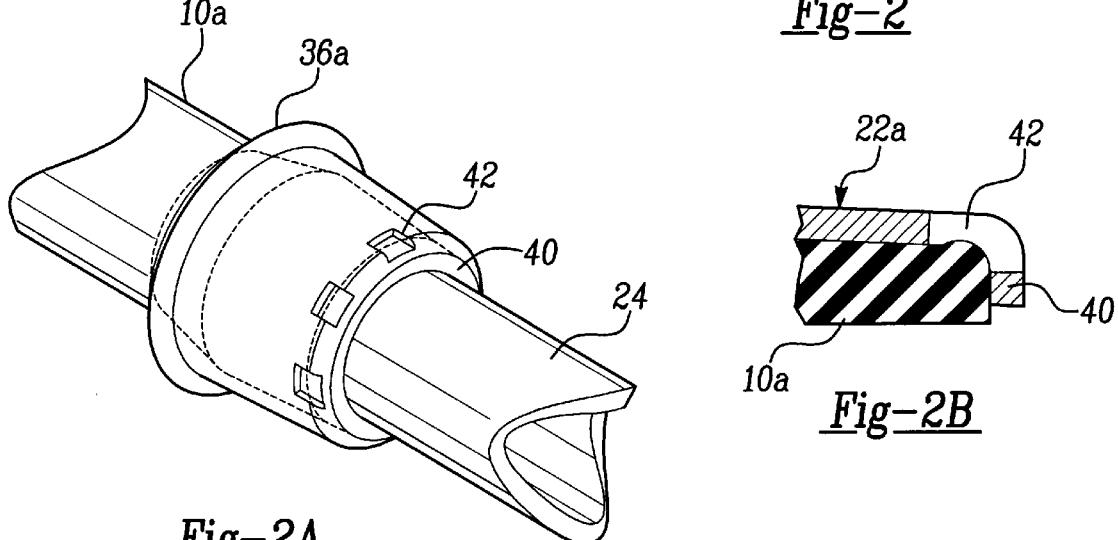
Fig-2A
Fig-2B

APPARATUS FOR AND METHOD OF ATTACHING CONDUITS TO A FITTING This is a continuation-in-part application of U.S. patent application Ser. No. 07/776,824 filed Oct. 15, 1991, now U.S. Pat. No. 5,388,870, issued Feb. 14, 1995, which is a division of application Ser. No. 07/504,543, filed Apr. 4, 1990, now U.S. Pat. No. 5,261,706 issued Nov. 16, 1993, which is a division of application Ser. No. 07/265,263, filed Oct. 31, 1988, now U.S. Pat. No. 4,923,226, issued May 8, 1990, which is a continuation-in-part of application Ser. No. 071,189,395, filed on May 2, 1988, now abandoned, which is a continuation-in-part of application Serial No. 071,066,749, filed on Jun. 23, 1987, now abandoned.

BACKGROUND AND SUMMARY INVENTION

This invention relates to a method and apparatus for attaching conduits to a fitting and more particularly to a specially configured conduit coupling and apparatus.

Attaching hoses and tubes to fittings to form a reliable fluid-tight coupling has presented problems over the years. For example, Deutschese Reich 424980 (1926) provides a spring for driving an interiorly threaded sleeve onto the hose. These threads are at a different taper than that of the sleeve or fitting and bite into the outside of the hose to compress the sleeve about the hose and the hose about the fitting, thereby retarding loosening or pull-off of the hose from the fitting. Dutch Pat. No. 27183 (1932) provides a coupling nut which is threadably advanced about the sleeve in a direction that drives the outer sleeve up onto the fitting and about the hose to increase the pressure between the hose and fitting. These means have proven unsuccessful over the time that is desired by the user.

In accordance with the present invention, a preferred embodiment of a conduit coupling has a fluid fitting and a locking sleeve. The fluid fitting has portions which are insertable within a conduit for expanding adjacent portions thereof. The locking sleeve is locatable on an exterior portion of the conduit longitudinally proximate with at least one portion of the fluid fitting inserted within the conduit. Thus, the conduit is clampingly secured between the locking sleeve and the fluid fitting.

In one aspect of the conduit coupling of the present invention, a centering mechanism centers a fluid fitting in relation to a locking sleeve. In another aspect of the present invention, the conduit coupling is bi-conical. In a further aspect of the conduit coupling of the present invention, an elastomeric seal is provided. In yet another aspect of the present invention, the conduit coupling provides a snap together quick connection.

The conduit coupling of the present invention is advantageous over conventional connections since the present invention can be quickly and easily assembled by hand. The present invention is also less expensive to manufacture and assemble than traditional connections. Moreover, the present invention provides a much more reliable fluid seal between the coupling and the conduit. A variety of different types of pressure or vacuum confining conduits are shown and described herein. The foregoing and other advantages will become more apparent when viewed in light of the accompanying drawings and the following detailed description wherein:

BRIEF DESCRIPTION OF THE DRAWINGS

FIG. 1 is a side elevation view in cross-section of a fluid-tight coupling comprising a hose clamped by a sleeve about a tubular fitting;

FIG. 2 is side elevation view, partially in section, of an alternate embodiment of a fluid-tight coupling wherein a bi-conical fitting is used to terminate oppositely extending hoses;

FIGS. 2A and 2B provide detail of the left end hose coupling shown in FIG. 2;

DETAILED DESCRIPTION OF THE PREFERRED EMBODIMENT

Figure 3:
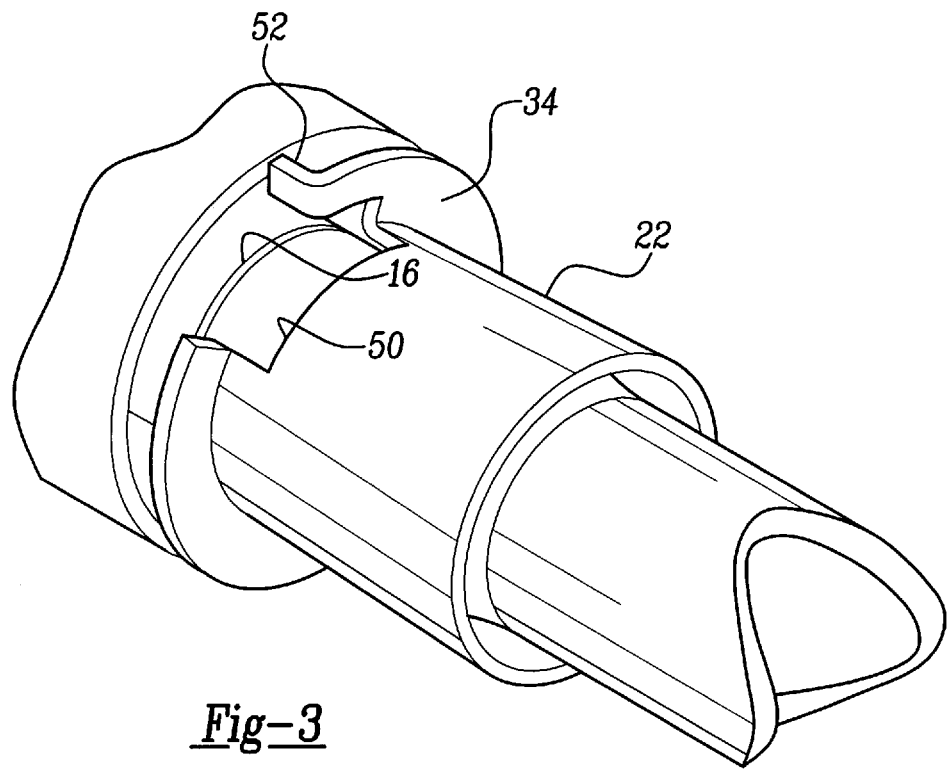
FIG. 3 is a perspective view of an alternate embodiment of a fluid-tight coupling including an arrangement for gripping the hose.

Turning now to the drawings, FIGS. 1–17 show fluid couplings each generally comprising a bi-conical fitting, a locking sleeve disposed about the fitting and at least one tubular conduit 10, such as a tube or hose, clampingly secured to the fitting by the sleeve. The forward end portion of conduit 10 is pushed onto a frusto-conical lead on entry defining an open end of the fitting, over a crest and onto a reverse frusto-conical portion and held thereto by the clamping or gripping action of the outer sleeve. Various elements of hose connections and gripping arrangements are disclosed herein.

In FIGS. 1–17, the fitting has been shown with a Lead-on for the hose onto the fitting, and some lead-in chambers on the outer locking sleeve. It has been recognized that to be viable in the marketplace, it is necessary to always have lead-ins and lead-ons. Also, that by requiring this situation, it is even possible to quick-connect assemble a hose to a fitting. The Separate lead-on and lead-in for a hose and tube constitute a "Double Included Angle" for the outer and interior fitting portions. Conduit 10 is representative of single or multiple wall, reinforced, or not-reinforced generally routable, not rigid metal, construction for use in fluid installations, such as hydraulic or pneumatic equipment. Conduit 10 preferably consists of a material that is deformable to an extent, but not (or only slightly) compressible. In other words, not a foam which is compressible because of its porosity or trapped gas which is compressible. Conduit 10 is generally axially extending having concentric outer and inner surfaces 12 and 14 and a forward end 16 cut square, the inner surface 14 defining a central bore 18 to confine and pass the fluid or gaseous media.

FIGS. 1–12B limit the double included angle of the longest length frusto-conical surface to a maximum of 8 degrees. According to the invention herein, and as shown in FIGS. 13–17, the double included angle could be 10 degrees.

Conduit 10 is representative of single or multiple wall, reinforced, or not-reinforced generally routable, not rigid metal, construction for use in fluid installations, such as hydraulic or pneumatic equipment. Conduit 10 consists of a material that is deformable to an extent, but not (or only slightly) compressible. In other words, not a foam which is compressible because of its porosity or trapped gas which is compressible. Conduit 10 is generally axially extending having concentric outer and inner surfaces 12 and 14 and a forward end 16 cut square, the inner surface 14 defining a central bore 18 to confine and pass the fluid.

FIG. 1 shows a fluid coupling formed along an axis "A" wherein the forward end portion of conduit 10 is coaxially sandwiched between a generally axially extending tubular fitting 20 and an outer locking sleeve 22. The Fitting 20 has an axial bore extending therethrough and generally comprises a cylindrical body member 24 from which a hose terminating bi-conical portion 26 extends, the bi-conical portion including a first and a second end portion 28 and 30, each end portion being generally frusto-conically shaped. The respective exterior surfaces of the end portions 28 and 30 are conical and defined by a double included angle "B" and "C" relative to axis "A" and intersect at a crest 32 defining the largest diameter portion which expands the hose. Generally, the cylindrical body member 24 is a portion of some device such as a rigid pipe, a fluid connector, or some attachment which passes the fluid confined by conduit 10. The end portion 30 defines a lead-on area for receiving the and expanding the hose end portion and the end portion 28 defines a reverse taper surface area for the hose to grip. The fitting 20 would preferably be constructed of rigid material, so as to resist diametric reduction during the life of the attachment such as steel, brass or an oriented organic fiber.

The outer locking sleeve 22 is generally frusto-conical in cross-section and its interior wall is conical for gripping the hose exterior and is formed by a double included angle "D" relative to axis "A". The locking sleeve 22 includes rearward and forward end portions 34 and 36 at its opposite ends. The rearward end portion 34 defines a radial flange 34 extending radially outward from the sleeve to assist the user in coaxially driving the locking sleeve 22 relative to conduit 10 and the body portion 28 of the fitting 20 over which the locking sleeve is located whereby to lock the locking sleeve relative to the hose and fitting. Preferably, the forward end portion 36 flares radially outwardly and extends to a point equal to or forwardly of the crest 32 between the frusto-conical end portions 28 and 30 when the locking sleeve is locked to the hose. The extended portion 36 (or overhang) forms a frusto-conical lead-in for assisting in the inward insertion of the hose end portion, the positioning of the sleeve, or in supporting the hose in situations where the hose is bent adjacent the fitting end. Preferably the locking sleeve 22 is made from some material that has band strength and resists diametric expansion during the life of the attachment, such as steel, brass or an oriented organic fiber material.

In accordance with this invention, it has been found that the included angle "B" for the exterior frusto-conical surface portion on fitting, and "D" for the interior surface of the outer locking sleeve 22 are very important to achieving the unexpected results that improve the reliability of the attachment to an extent that it is commercially desirable, as explained by the following. Specifically the double included angles "B" and "D" of these frusto-conical surfaces should be nearly matched, and preferably be between one degree and eight degrees (i.e., a taper angle of about ½ degree to less than 5 degrees per side). These small double included angles "B" and "D" result in a tremendous "mechanical advantage" wherein forces applied to the locking sleeve 22, to "drive" the sleeve towards the largest diameter at crest 32 and into engagement with conduit 10, are multiplied many times to result in extremely high capturing or clamping forces being applied to conduit 10. This condition results in a high squeezing force being applied to the hose or tube contact surfaces 12 and 14 of conduit 10 such that a much smaller force need be applied to the outer locking sleeve. By using slightly different angles for B and D (angle D being slightly smaller), the squeezing force applied by the outer locking sleeve 22 is equalized on the wall of conduit 10. This results in minimizing the "killing" of the polymer which has been used as the material for conduit 10. The smaller axial forces on outer sleeve 22 can work against any sealing between the interior of conduit 10 and the interior fitting portion 28. This is countered by pushing outer sleeve 22 up on conduit 10 to an extent that the squeeze force is not upset by a force that pushes on conduit 10 (away from the connection shown) because of the length of the pushing stroke, and the natural deformation of conduit 10.

According to the invention herein, there is further provided a mechanism for centering and temporarily retaining the locking sleeve and the fluid fitting in concentric relation in order to assist conduit 10 being presented to the fitting area 26. The purpose of this centering mechanism is to remove the necessity for moving the locking sleeve 22 to a position where the sleeve 22 is concentric with conduit 10, after conduit 10 is first started over the lead on and before conduit 10 enters the sleeve 22.

This centering mechanism, and a coil spring (also not shown in FIG.1) that pushes on the fitting 20 drives the sleeve 22 into engagement with conduit 10, and a separate sealing means (not shown in FIG. 1) for sealing between the interior surface of conduit 10 and the exterior surface 26 of the fitting 20, the longest length double angle area 26 of the fluid fitting, separates the sealing of conduit 10 from the retention of conduit 10 and allows conduit 10 to be quick connected to fitting area 26. This allows hose and tube 10 to be "pushed" and not defeat the sealing. Of course, a variety of other centering mechanisms and sealing means may be employed. For example, the centering mechanism may use an elastomeric material in place or in addition to the spring. Also, a variety of elastomeric, pumpable or hand applied seals may be provided.

There are situations with constructions of conduit 10 where it is very difficult to expand the diameter of conduit 10. In order that conduit 10 be hand assembled over the crest 32 of the fluid fitting 20, the largest diameter of the fitting where the reverse taper surface area of the rearward end portion 28 meets the lead on area of the forward end portion 30, it is necessary to limit this largest diameter. To gain extra retention it is convenient to slightly reduce the free diameter of conduit 10 at the root or smallest diameter of the reverse taper area 28. In every case since the surface area of the rearward end portion 28 is tapered, there will be a smallest and largest diameter. The wall thickness of conduit 10 will be slightly less at the largest fitting diameter than it would be at the smallest diameter of the rearward end portion 28. Since the largest "footprint", that is the surface area of conduit 10 captured between the fluid fitting 20 and the outer locking sleeve 22, is desirable in order that stresses on the material of conduit 10 be minimized by having the capturing force distributed over a large volume area, it is necessary that the angle of the locking sleeve be somewhat less than the angle of the fluid fitting. This difference is dictated by the variation in thickness of conduit 10. It is possible to make a workable attachment using a double included angle "B" that is equal to or even slightly less than the double included angle "D", because of the unusually tolerant situation that is achieved when angles between one and four degrees are used, but best results are obtained from a longevity standpoint by minimizing the stresses on the material of conduit 10.

It will be found to be advantageous to dimension the locking sleeve 22 in a manner such that in the maximum tolerance condition where the dimensions are such that the sleeve 22 moves at the least an amount over the lead on portion 30, and that the locking sleeve 22 contact area with conduit 10 be positioned so as to be in contact with conduit 10 at the crest 32 (i.e., the greatest diameter of the fitting 20). Secondary locking means serve to assure that the positional relationship of conduit 10 relative to the fluid fitting 20 and the locking sleeve 22 is secured throughout the service life of the attachment. Generally, as conduit 10 tends to be pulled off the bi-conical fitting, the outer locking sleeve follows conduit 10 to further tighten the joint. The lock between conduit 10 and the locking sleeve could in some applications be limited to the small half of the locking sleeve and be operable directly on the outer portion of conduit 10 (or outer portion of an intermediate element positioned between the exterior of conduit 10 and the interior of the sleeve). In this case stresses imposed have may a smaller effect on the stresses involved in sealing and retention than current attaching methods, and not toward the large diameter.

In the embodiments shown in FIGS. 2–12B the respective sleeve and fittings use the same angles "B" and "D" to achieve the same result. Elements that are similar as previously described will be marked with the same reference number. The embodiments to be discussed will respond to surface shape and 25 conditions that are common to various conduits 10, and the use of a separate-sealing means to seal the conduit to the fluid fitting 20 which is used in conjunction with the attaching means. For example, an interposed seal is necessary to counteract the loss of sealing as the wall of conduit 10 moves away from the squeezing force applied by outer sleeve 22, and the wall of conduit 10 gets somewhat thinner.

FIGS. 2, 2A and 2B show a conduit coupling wherein both ends of cylindrical body member 24 will be used to receive, each, a conduit 10a and 10b, the body member having a cylindrical rib 38 which defines a stop. Each end of the body member 24, designated with the letters "a" and "b", respectively, when considering the left or right extending end, is provided with a bi-conical portion 26a and 26b including first and second end portions 28a and 30a and 28b and 30b, respectively, to receive one respective conduit 10a and 10b. A frusto-conical clamping member or locking sleeve 22a and 22b is located about the respective conduit end portion and end portion 28a and 28b. The respective inner surfaces of the locking sleeves 22a and 22b and the exterior surfaces of the conical end portions 28a and 28b clampingly grip the respective conduit 10a and 10b end portion. The frusto-conical double included angle "B" describes the exterior surfaces of the end portions 28a and 28b and the frusto-conical double included angle "D" describes the interior surfaces of the sleeves 22a and 22b.

The locking sleeve 22a would be manufactured with a flange 40a partially turned inward, the flange 40a being bent radially inward to allow the sleeve 22a to be loosely attached to the fitting 20a. The sleeve 22a is located on the fitting 20a prior to pushing conduit 10a up over the fitting 20a. By making the flange 40b so that conduit 10a is not stopped by the locking sleeve 22a as it is pushed onto the fluid fitting 20a, conduit 10a will merely centralize the locking sleeve 22a as conduit 10a is pushed on. As shown in FIG. 2, the formations of 42, 44, 46 or 48 may be used to better lock conduits 10a or 10b to the fluid fittings 20a or 20b and the locking sleeves 22a or 22b. Care must be taken to minimize "killing", and use only the amount of conduit 10, and sleeve 22 retention that is necessary.

Means of assuring the positioning of the parts throughout the life of the attachment include provision of a slot 42, flange 40, and rib 48 in the sleeve 22, the slot 42 providing an area where the material of conduit 10a can bulge up into the slot 42 after the distortion of conduit 10a that results from locking or "setting" the sleeve 22a to effect the attachment of conduit 10a to the fitting 20a. Because of the large "footprint" (previously defined) of the locking sleeve 22a, and the special double included angles "B" and "D", very large compressive forces are developed on conduit 10a, but only a small distortion of conduit results. Because of the special small double included angles "B" and "D" however, very little material is required in shear (the bulged up portion of the material of conduit 10a) to effect a very robust locking of the position of the locking sleeve 22a on conduit 10a.

Means to lock conduit 10a to the fluid fitting 20a include provision of one or more raised portions on the surface of the reverse taper portion 28a of the fitting 20a. As shown, a raised area 44 to secure the position of conduit 10a on the fitting 20a is located from the minimum diameter area of the fitting 20a. Note also, that very little deformation of the material of conduit 10a would be used so that stresses on conduit 10a would be minimized. Small pinched up ears on the surface of the fitting 20a which would in effect be small segments of the raised area 44 are effective. The advantage of this treatment is that the "pinching" operation on the fitting 20a results in small pockets adjacent to the "ears".

The material of conduit 10a may thus be distorted into these pockets when displaced by the ears. This greatly reduces the force required to cause this distortion and makes setting the locking sleeve 22a easier and with less variability. The section extending to the right of the body member 24 includes an annular groove 46 which acts very much like the slot 42 and the sleeve 22b includes a radial rib 48 that acts very much like the raised area 44.

It is anticipated that in using the disclosed attaching method, that the locking sleeves 22a and 22b will be "set" by various means. These means would include hand setting, and setting by means of simple tooling. Some users may prefer a more visual mechanical means of setting with an easily inspectable result.

Figure 4:
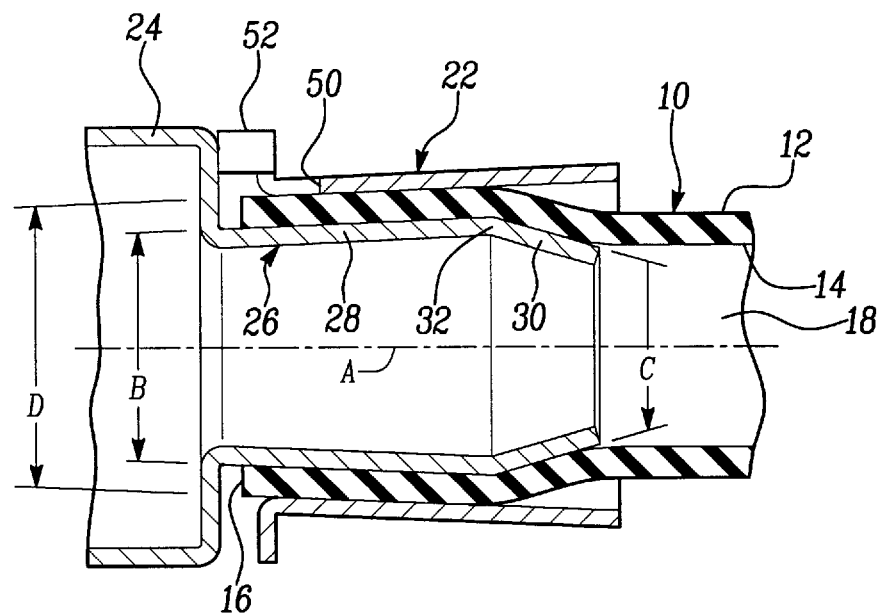
FIG. 4 is a side elevation view, in cross-section, of the coupling shown in FIG. 3.

FIGS. 3 and 4 show a fluid coupling wherein an alternate means of "setting" the locking sleeve are provided. Elements that are the same as previously described will be marked with the same reference number. An arcuate slot 50 (similar to the slot 42 in FIG. 2) has been formed in the locking sleeve 22 so that it frees a portion of the outward radial flange 34. A flange 52 is then provided to be employed as a bendable segment which drives the sleeve 22 up on to engagement to lock conduit 10 about the fitting 20. The flange 52 would be bent with an appropriate tool and because of the nature of the material, the sleeve 22 acts to urge the locking sleeve 22 into a set position. Or, alternately, flange 52 could be used to set sleeve 22. This would result from pushing on conduit 10 to an extent that conduit 10 is positioned far enough under sleeve 22 which has been stopped from being pushed back by the action of flange 52 against body member 24. The confirmation that the sleeve 22 has been set could then be visually accomplished by merely noting that flange 52 is in intimate contact with the body member 24. As before, extrusion of the conduit into slot 50 assists in locking the hose relative to the coupling.

Figure 5:
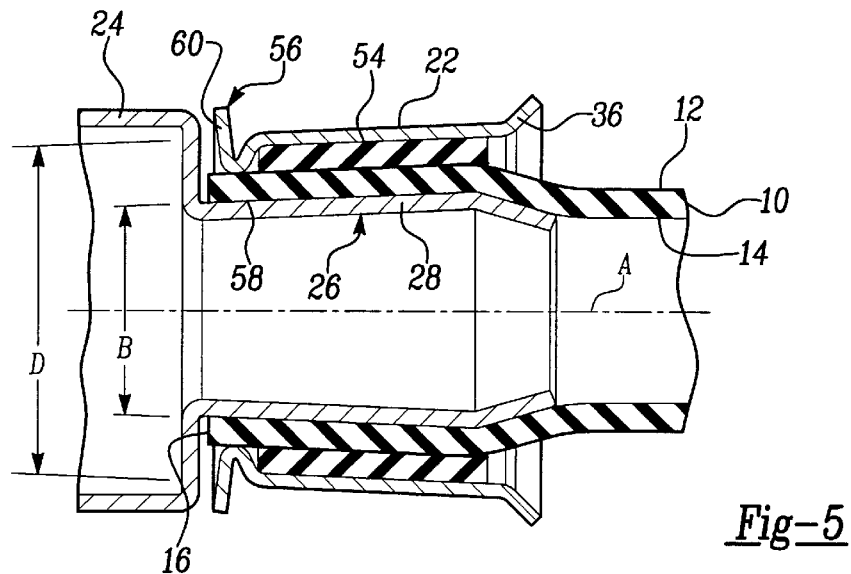
FIG. 5 is a side elevation view, in cross-section, of an alternate embodiment of a fluid-tight coupling sealing is to the interior fitting portion.

FIG. 5 shows a fluid coupling wherein conduit 10 has a rough outer surface. Elements that are the same as previously described will be marked with the same reference number. To minimize the stresses applied to conduit 10 in order to maximize its service life, a collar 54 of deformable material is sandwiched between the interior surface of the sleeve 22 and the outer surface 12 of the hose. The collar 54 distributes the forces applied by the sleeve 22 to conduit 10 more evenly, thus reducing the stresses developed in conduit 10 from the compression forces that result from setting the sleeve 22. The rough outer surface of conduit 10 will lock material of the collar 54 into position. If desired, a slot 42 or 50 may be used to lock the outer locking sleeve 22 to the material of the collar 54. The forward end of the sleeve would be flared at 36 and a reversely bent flange 56 which has a radially inward portion 58 to captivate the collar about conduit 10 and assist its movement during locking. A radial outward portion 60 assists in driving the sleeve 22 relative to the hose.

Figure 6:
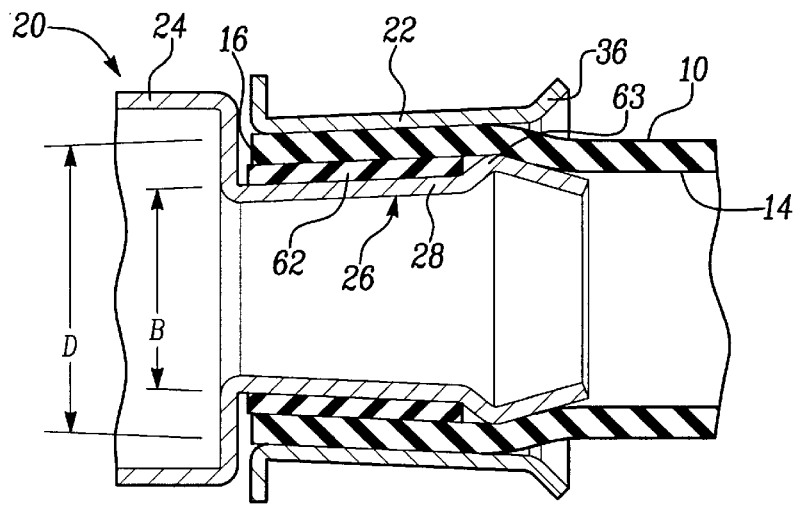
FIG. 6 is a side elevation view, in cross-section, of an alternate embodiment of a fluid-tight coupling showing a redundant seal.

FIG. 6 shows a fluid coupling that is similar to the coupling shown in FIG. 5. Elements that are the same as previously described will be marked with the same reference number. In this embodiment the inner surface 14 of conduit 10 is not sufficiently smooth to be axially positioned, to properly seal, or to reduce the stresses in the hose. Interposed between the hose and the end portion 28 of the fluid fitting 20 is a frusto-conical band 62 comprised of a material that is more tolerant of conduit deformation, so as to functionally survive the increased useful life. The fitting 20 is formed with a outward radial portion 63 to prevent the interposed band 62 from being pulled off of the fitting 20.

Figure 7:
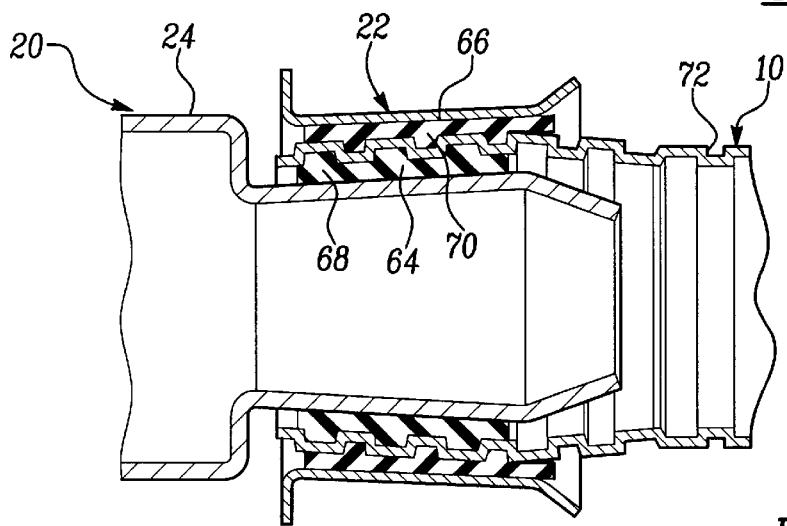
FIG. 7 is a side elevation view, in cross-section, of an alternate embodiment of a fluid-tight coupling including redundant elastomeric sleeves which clampingly engage a corrugated hose.

FIG. 7 shows a fluid coupling embodiment disclosing a further aspect of the embodiments discussed in FIGS. 5 and 6. Elements that are the same as previously described will be marked with the same reference number. In this embodiment conduit 10 is formed by a corrugated material that is often used for very low pressure applications, but which is not suited for the sleeve lock approaches heretofore described. Conduit 10 is interposed between shaped sleeves 64 and 66, the sleeve 64 being inner and the sleeve 66 being outer to the hose, the sleeves 64, 66 being interposed between the locking sleeve 22 interior frusto-conical surface and the fitting 20 exterior frusto-conical surface, the sleeves 64, 66 being conical and substantially matching the inner and outer surface configuration of conduit 10. A very low stress is developed in conduit 10, which greatly extends the service life of the hose. If the projecting portions 68 and 70, from the respective sleeves 64, 66 are helically wound, and the corrugations 72 are helically wound, each mesh together and rotation tightens the coupling. In this case rotation will also loosen the coupling means (not shown) can be used to prevent this.

Figure 8:
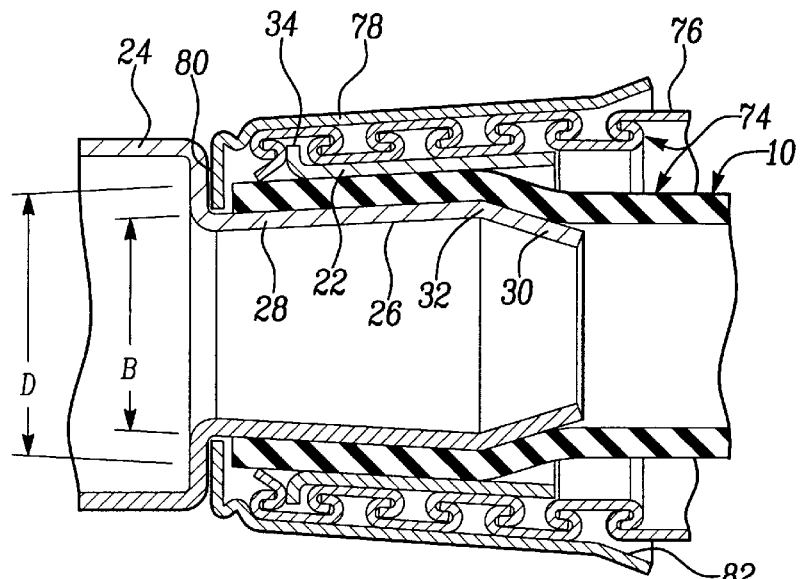
FIG. 8 is a side elevation view, in cross-section, of an alternate embodiment of a fluid-tight coupling showing a combination conduit.

FIG. 8 shows a "Greenfield" type conduit 74 comprising an inner conduit liner 76 and a rugged outer conduit 10 to provide mechanical strength in and a sealed relationship with the fitting 20 with the required mechanical integrity to be useful for high pressure applications. The conduit 74 has been assembled over the fitting area 26 and into the sleeve 22 and set or locked as previously described. The outer conduit 76 has been compressed back (it is spring like) during this operation. A ferrule 78, having an outward flare 82 forwardly of the crest 32 and having been first assembled over fitting area 26 along with the locking sleeve 22, is used to drive the sleeve 22 into its locked position by forming ferrule 78 forward of inward flange 80. The interior of the outer conduit 76, being larger in diameter than the diameter of the flange 34, passes over the flange 34, and the end of the outer conduit 76 drives the ferrule 78 back against the body member 24 when it engages the inward flange 80. A flange like that shown as flange 52 in FIGS. 3 and 4 is helpful to assure the gap necessary for clamping. The ferrule 78 is then crimped adaptively around the inner form presented by conduit 76, flange 34 and sleeve 22 by means of adaptive crimping die shoes that are made from some deformable material-like rubber or urethane. The ferrule 78 thus mechanically secures the conduit 76, which is additionally engaged to the flange 34 of the sleeve 22, and further drives sleeve 22 into further engagement over the inner conduit 10 to additionally secure and seal the inner conduit liner 10 to the fitting 20. As pointed out earlier at the end of the discussion of FIG. 1 and shown in FIG. 9, a redundant seal is helpful for this application. Note that now the inner liner of conduit 10 is no longer required to withstand the blow-out forces of high pressure or temperature effects that might weaken conduit 10, since a slight expansion of conduit 10 is immediately limited by the very strong and temperature resistant outer conduit 76. The outer conduit 76 would be manufactured from metal (as an example of a suitable material) and thus the inner conduit 10 may be made from a material-like plastic that does not have the mechanical properties at high temperatures that are supplied by the outer conduit 76, and the required high pressure and temperature performance. The combination of conduits will thus operate at temperatures in excess of the capability of conduit 10 alone.

Figure 9:
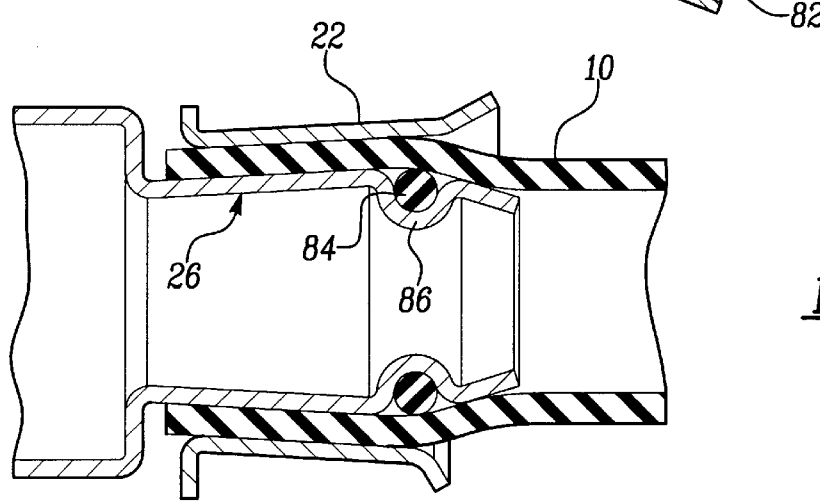
FIG. 9 is a side elevation view, in cross-section, of an alternate embodiment of a fluid-tight coupling showing a redundant seal.
Figure 10:
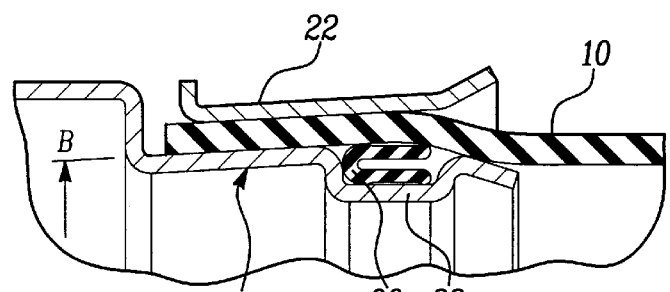
FIG. 10 a side elevation view, in cross-section, of an alternate embodiment of a fluid-tight coupling showing a cup seal.

FIGS. 9 and 10 are for situations wherein the redundant sealing capability would comprise a dynamic type seal which exerts more sealing pressure in response to an increase in pressure. In accordance with this invention the dynamic seal would be placed forward of the static (or compression) seal, such as described in the preceding embodiments. A benefit of the forward location, in conjunction with the sleeve lock-type attachment, is that less penalty in interior diameter through the attachment is encountered. The forward attachment will offer an improved dynamic seal which will easily out perform in time the known static compression seals that are used, and will also offer the added benefits to be derived from the use of a dynamic seal. There is a definite need to be able to get extended service life, and to be able to safely employ the otherwise superior plastic hose and tubing that is available today.

FIG. 9 shows a fluid coupling wherein the fluid fitting area 26 has near its hose receiving terminus an inward radial recessed channel 86 sized to receive therein an elastomeric seal 84. The depth of the channel is such that the seal 84 projects above the periphery of the fitting end portions 28 and 30. The seal is shown as an O-ring, and acts as an additional seal to seal the hose against the fitting end portions. Of course, other sealing means as discussed herein may be employed.

FIG. 10 is a fluid coupling with a separate sealing means similar to that shown in FIG. 9. The coupling includes an inward radial recessed channel 88 shaped to receive a "U" cup or "lip" type seal 90 comprised of elastomer. The U-shaped seal 90 better utilizes the confined pressure to develop seal contact force.

Figure 11:
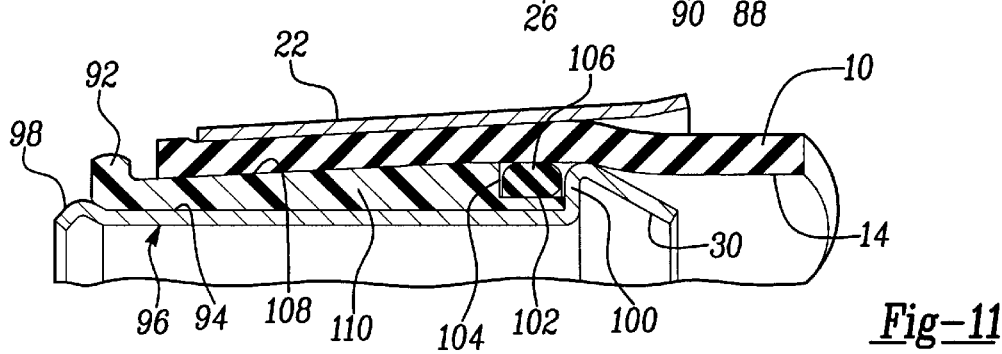
FIG. 11 is a side elevation view, in section, of an alternate embodiment of a fluid-tight coupling, showing the incorporation of a seal between the fitting end and conduit interior, and means for strengthening the fitting end.

FIG. 11 shows a fluid coupling wherein the fitting is modified to include a nipple 92 formed of plastic having an axial bore 94 therethrough and a metal sleeve 96 positioned within the bore. Outward radial flanges 98 and 100 from the sleeve serve to couple the sleeve 96 to the nipple such that the bore wall of nipple 92 fits snugly about the exterior of sleeve 96. An annular groove 102 is formed between a step 104 in the nipple 92 and the radial flange 100 on the sleeve, and the groove is sized to receive an elastomeric O-ring 106 that projects about the periphery 108 of the nipple to be in contact with the inner surface 14 of conduit 10. The nipple and sleeve are manufactured as a portion of the body member 24. Sleeve 22 operates as previously described, and embodiments shown in other figures might also be employed here, as they might be with any of the other embodiments shown in the various figures. The purpose of fitting end portion 30 is to provide a lead on area 34, and to allow the O-ring groove to be easily provided in manufacture, and to strengthen the tapered central portion 110 of the fitting 92. One would select metal as the material for sleeve 96 if the body member 24 were made from a material which would not resist the compressive forces (applied, by sleeve 22) over a long period of time for example. Conversely, if the material of the body member 24 were metal which would have the desired strength, then the sleeve 96 portion might be made of plastic.

Figure 12A:
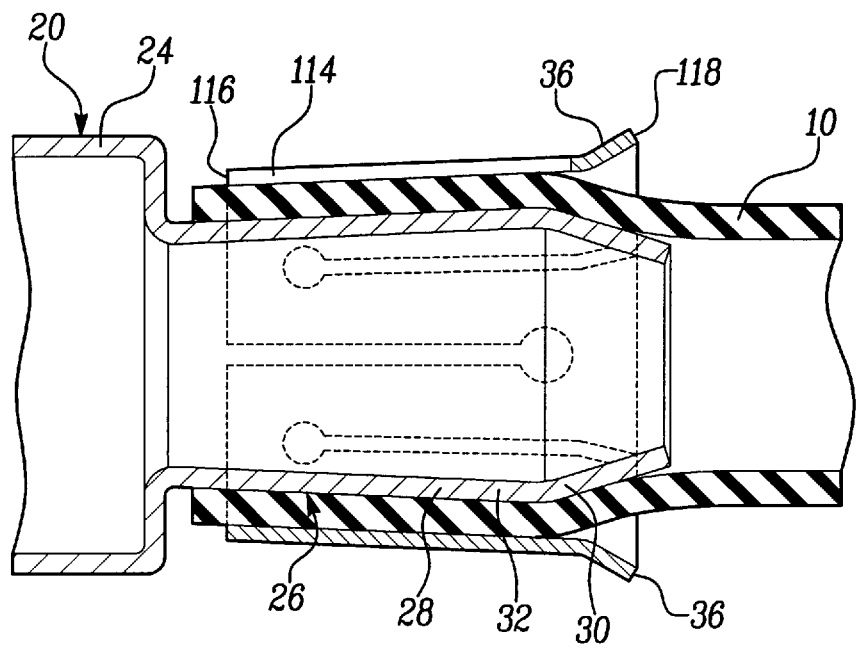
FIG. 12A is a side elevation view, in cross-section, of an alternate embodiment of a fluid-tight coupling, showing a serpentine-shaped sleeve clamped about the fitting.
Figure 12B:
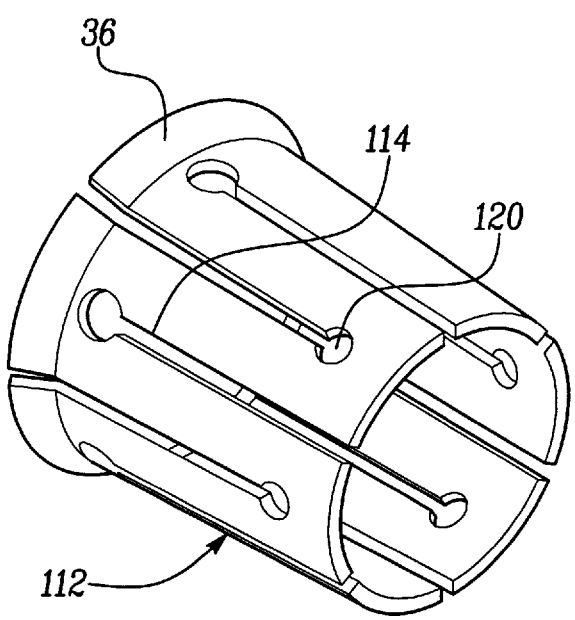
FIG. 12B is a perspective view of the serpentine-shaped sleeve shown in FIG. 12A.

FIGS. 12A and 12B show a coupling similar to FIG. 1 wherein a serpentine formed frusto-conical sleeve 112 is disposed about the fitting. The sleeve 112 is generally stamped from a flat sheet of metal stock with axial slots 114 extending inwardly from opposite edges 116 and 118 of the sheet but end short of the opposing edge. The slot radial widths are suitably dimensioned to allow the sheet to be rolled into a frusto-conical shape, whereupon the adjoined edges are joined. Resiliency of the cone to accommodate rough surfaced conduit and could be provided by keyhole 120 enlargements at the root of one or more of the slots. The forward end portion 36 of the sleeve 112 is overhung beyond the crest 32 connecting the frusto-conical end portions 28 and 30.

According to this invention, FIGS. 13–17 disclose fluid coupling arrangements for establishing sufficient concentricity between the locking sleeve 22 and the tubular fluid fitting 20 sufficient for the forward end portion of conduit 10 to enter the annular chamber formed therebetween. In particular, these coupling arrangements allow conduit 10 to be rapidly assembled to the fluid fitting with the resulting assembly simultaneously securing and sealing the conduit to the fitting and providing a visual indication that the assembly is complete. Elements that are the same as previously described will be marked with the same reference number. Angles "D" and "E" comprise a double included angle for sleeve 22, where area 36 is no longer a chamfer, but a frusto conical lead-in.

Figure 13:
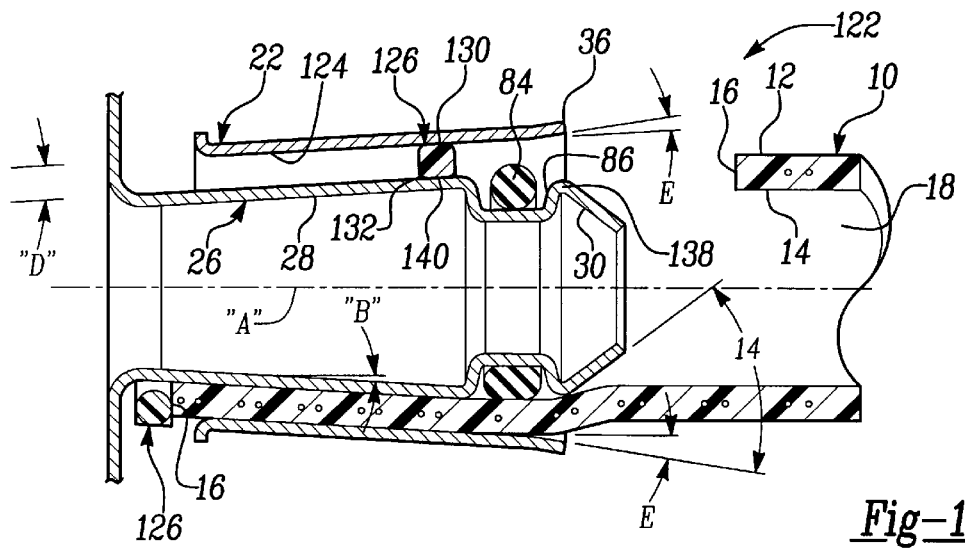
FIG. 13 is a side elevation view, in cross-section, of another preferred embodiment of a fluid tight coupling according to this invention including a spring ring for centering components of the coupling for assembly with a fluid conduit and having a redundant non-rotatable seal.

FIG. 13 discloses a conduit coupling 122 that is similar to the arrangement described above in connection with FIG. 9 and includes the generally axially extending tubular conduit 10, the bi-conical fluid fitting 26 having the frusto-conical portions 28 and 30 and the inward radial channel 86 and seal 84 arrangement axially rearward of the frusto-conical lead on 30, and the locking sleeve 22 having the frusto-conical lead in 36 and the frusto-conical inner wall 124. In FIG. 13, the upper half of the FIG. shows the fluid fitting and locking sleeve of the hose coupling prior to assembly with conduit 10 and the lower half shows the completed conduit coupling.

Figure 14:
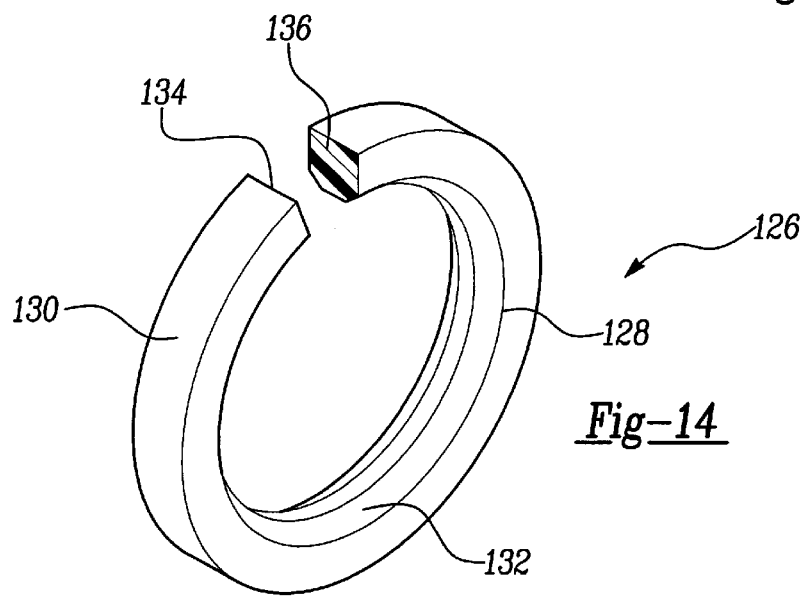
FIG. 14 is a perspective view of the spring ring.

According to this invention, as best shown by reference to FIG. 14, a resilient cylindrical split spring ring 126 is preassembled on the bi-conical fluid fitting 26 to locate the locking sleeve 22 in centered concentric relation to the fluid fitting prior to assembly with conduit 10. Preferably, the spring ring 126 has generally concentric inner and outer surfaces 128 and 130, a chamfered edge 132 and a pair of confronting ends 134 and 136. The spring ring 126 is adapted to radially expand and contract relative to the bi-conical fluid fitting 26. The inner surface 128 is dimensioned to contract and engage the frusto-conical portion 28 and temporarily position the spring ring at selective axial positions relative to the fitting. The outer surface 130 is dimensioned to engage the frusto-conical inner wall 124 of the locking sleeve 22 and lock the locking sleeve 22 in concentric relation with the bi-conical fluid fitting 26 when the spring ring is radially expanded at a larger diameter portion of the fitting and temporarily positioned adjacent to the location of the seal 84. The chamfered edge 132 facilitates insertion of the spring ring onto the fluid fitting and sliding movement over the seal 84. Spring ring 126 expands in diameter when spring ring has been pushed completely through sleeve 22 by conduit end 16. Portions 138 of spring ring 126 keep outer locking sleeve 22 from being pushed back as far as conduit 10 end 16 during assembly over the interior fitting portion of the fitting when spring ring 126 expands.

In the embodiment shown, the bi-conical fluid fitting 26 and the locking sleeve 22 are constructed so that the surfaces 28 and 124 of each are formed with a respective angle "B" and "D" relative to the central longitudinal axis "A". The frusto-conical surfaces 28 and 124 increase in diameter toward the inserting end of the fluid fitting with the angle "D" of the locking sleeve 22 being less than the angle "B" of the bi-conical fluid fitting 26.

Further, the frusto-conical lead on 30 and lead in 36 are arranged to form a throat to assist entry of the forward end portion of the hose into centered engagement with the spring ring 126. The lead on and the lead in form an annular V-shaped throat with the angle of the "V" being generally between 60 degrees and 100 degrees. The angle "V" would depend on the application, such as the diameter of the hose bore, the thickness of the hose wall, or the hose material or the diameter of the fitting defined by the lead on 30.

The seal 84 is positioned by the channel 86 so as to be axially inward of the lead on 30 and in its uncompressed state is dimensioned to project radially above the peripheral outer surface of the fluid fitting. The seal 84 operates to provide a 360° sealing engagement between and around the outer surface of the fluid fitting 26 and the inner surface 14 of conduit 10. Additionally, the seal 84 inhibits axial movement of the conduit relative to the fluid fitting when forward end portion of the conduit is compressed in the annular chamber.

Further, the bi-conical fluid fitting 26 may be constructed of several parts. Such a situation would be presented wherein a liner of metal is used to reinforce a plastic fitting. The metal liner can be made so as to include the conduit entry lead on portion, and also to include a positioning surface for the seal 84.

According to this invention, in operation, the chamfered edge 132 of the spring ring 126 is forced onto the lead on 30 and the spring ring is temporarily positioned relative to the forward end of the fluid fitting. Preferably, the spring ring would be initially positioned such that the inner surface 128 engages a crest 138 defined by the lead on 30 or a forward end portion 140 of the reverse area of the frusto-conical end portion 28. The locking sleeve 22 is moved axially forwardly and the inner wall 124 thereof brought into an interference fit with the outer wall 130 of the spring ring, thereby temporarily detaining the locking sleeve 22 relative to the bi-conical fluid fitting 26. The lead on 30, the lead in 36 and the spring ring 126 form the annular V-shaped throat to direct the end of the conduit into the annular chamber.

As described above, the forward end portion of conduit 10 is then inserted into the V-shaped throat, pushed onto the frusto-conical lead on 30 which defines the open end of the fitting, over the crest 138, and axially rearwardly of the seal 84 and onto the forward end portion of the fitting. As conduit 10 is forced axially rearward, the forward end 16 of conduit 10 forces the spring ring into, through, and outwardly of the annular chamber formed between the locking sleeve and the fluid fitting. As spring ring 126 expands in diameter, conduit 10 enters under portions 138 of ring 126, so that a portion of conduit 10 was also completely passed through sleeve 22. The appearance of the spring ring, or conduit, provides a visual indication that the inserted end portion of conduit 10 has been satisfactorily secured in sealed relationship.

In some applications, the fluid coupling must be such that conduit 10 can rotate relative to the fluid fitting whereby to reduce the stresses which act on the conduit during installation or when installed. According to this invention, referring to FIG. 15, a hose coupling 142 includes a fluid fitting 146 that is constructed of two relatively rotatable parts. The first part of the fluid fitting 146 comprises a cylindrical body 148 of constant diameter and the frusto-conical lead-on 30 which defines a shoulder 150 adjacent to the forward end of the fluid fitting. The second part comprises a tubular mounting sleeve 152 having a frusto-conical body 154 defined by the angle "I" and having its opposite axial ends turned radially inwardly to define a pair of radial flanges 156 and 158 which support the mounting sleeve 152 for rotation relative to the outer surface of the cylindrical body 148. Angle "I" is the same as Angle "B" in earlier figures.

The locking sleeve 22 is as described before and serves to clampingly seal about the outer surface 12 of conduit 10. The frusto-conical surfaces of the mounting sleeve 152 and locking sleeve 22 increase in diameter toward the inserting end of the fluid fitting 146 with the angle "D" of the locking sleeve 22 being less than the angle "I" of the mounting sleeve 152.

In such arrangement, the sleeves 22 and 152 enable conduit 10 to rotate about the cylindrical body 154 of the fluid fitting 146 without losing sealing during rotation. Further, the fluid coupling 142 positions a sealing member 84 in the form of an O-ring comprised of resilient elastomeric material in an annular recess formed between the radial flange 158 and the shoulder 150 to maintain axial sealing.

Preferably, as described hereinabove, a resilient split spring ring 126 is preassembled on the forward end of the fluid fitting 146 to locate the locking sleeve 22 in centered concentric relation to the fluid fitting 146 prior to assembly of conduit 10. The spring ring 126 is initially located at the forward end of the fluid fitting, such as at the crest of the shoulder 150 or on the surface area 160 of the mounting sleeve 152.

Figure 15:
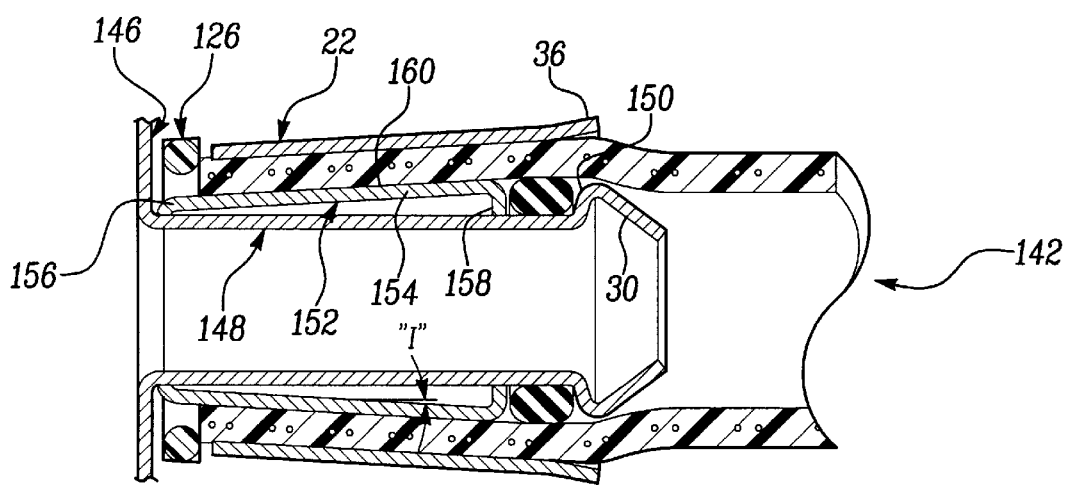
FIG. 15 is a side elevation view, in cross-section, of another preferred embodiment of a fluid tight coupling according to this invention including a spring ring for centering components of the coupling for assembly with a fluid conduit and having a rotatable seal, separating sealing from retaining.

Thereafter, the locking sleeve 22 is moved axially forward and its inner wall 124 brought into an interference fit locked engagement with the outer wall 130 of the spring ring 126, temporarily detaining each in locked concentric relation. The lead in 36 of the locking sleeve and the lead on 36 of the cylindrical body 148 form an entry throat, having the annular V-shaped angle "V" as described hereinabove, to guide and direct the conduit into the annular chamber formed between the locking sleeve and the fluid fitting. The forward end portion of conduit 10 is then pushed onto the lead on 30, against the spring ring and towards the rearward end of the fluid fitting, thereby pushing the spring ring through the annular chamber and outwardly of the locking sleeve. FIG. 15 shows the conduit coupling 142 when fully assembled and the spring ring 126 pushed axially rearwardly of the mounting sleeve 152 to provide a visual indication that the assembly is complete.

Figure 16:
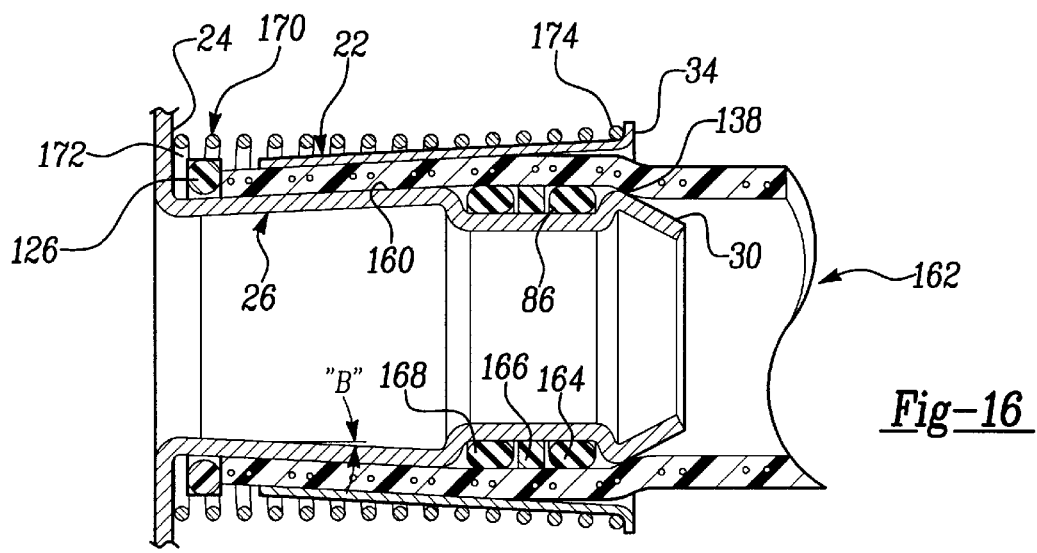
FIG. 16 is a side elevation view, in cross-section, of another preferred embodiment of a fluid tight coupling according to this invention including a spring ring for centering components of the assembly for assembly with a fluid conduit and having a spring member arranged for maintaining sealed compression about the conduit and a redundant seal.
Figure 17:
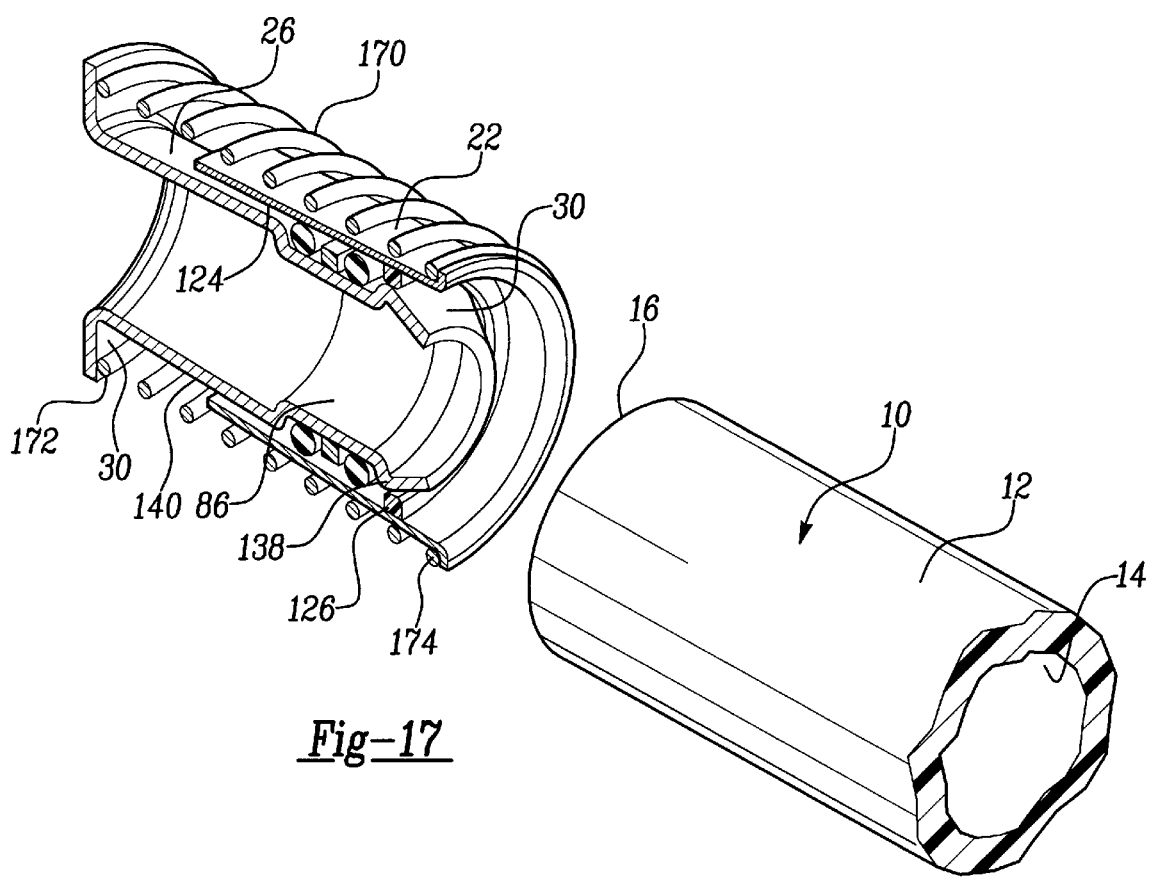
FIG. 17 is a side elevation assembly view of the fluid tight coupling of FIG. 16, shown in perspective and partially cut-away.

In some applications, the fluid coupling must be such that the fluid fitting and the locking sleeve 22 must act as a quick connector for a conduit 10 being assembled. Referring to FIGS. 16 and 17, a conduit coupling 162 comprises the fluid fitting 26 having the rearward body member 24 and the inward radial channel 86 axially rearward of the lead on 30 for positioning the seal members 164 and 168, and the locking sleeve 22 having the outward radial flange 34.

Preferably, according to this invention, a coil spring 170 having opposite ends 172 and 174 is coaxially located about the outer surface of the locking sleeve 22 with the rearward spring end 172 being abutted against the body member 24 of the fitting 26 and the forward end 174 being abutted against the radial flange 34. Importantly, the coil spring 170 ensures that the locking sleeve 22 is always driven axially forwardly towards the seal members 164 and 168 and relative to conduit 10 and also when the conduit is positioned between the locking sleeve 22 and the fluid fitting 26.

Further, and according to this invention, a resilient split spring ring 126 is preassembled on the fluid fitting 26 to temporarily locate the locking sleeve 22 in centered concentric relation to the fluid fitting 26 prior to assembly of conduit 10. As described above, the spring ring 126 is initially located at the forward end of the fluid fitting, such as at the crest 138 of the lead on 30 (as shown in FIG. 17) or on the surface area 160 of the frusto-conical portion 28.

In operation, referring to FIG. 17, the spring ring 126 is pushed onto the lead on 30, radially expanded, and positioned adjacent the seal 84. The locking sleeve 22 is biased forwardly by the coil spring 170 such that the inner wall 124 is forced into an interference fit with the outer wall 130 of the spring ring 126, temporarily securing the fluid fitting and the locking sleeve in concentric relation and defining a throat leading into the annular chamber formed between the fluid fitting and the locking sleeve. The forward end of conduit 10 is forced axially into the entry throat formed between the lead in and the lead on, onto and over the lead on 30, and the spring ring is forced rearwardly and outwardly of the locking sleeve 22. The coil spring 170 maintains the forward bias on the locking sleeve, thereby compressing the inner and outer surfaces 12 and 14 of conduit 10 against the outer surface of the fluid fitting 26 and the inner wall 124 of the locking sleeve.

From the foregoing figures and explanations, it is seen that the sleeve lock concept is adaptable to many variations of conduits. The sleeve lock concept is commercially viable because of the recognition that there is a small range of angles, that when used, provide a dramatic improvement in retention and sealing that make a commercially reliable, and therefore acceptable device possible. The inherent low cost of the reverse taper locking means has made such a device be recognized as potentially commercially attractive for years, but previous attempts to provide such a device always failed because those who were attempting to develop and market such a device failed to comprehend the special small range of angles, cost related considerations, and improvements that make such devices commercially acceptable, is a necessary precedent to achieving that goal.

To improve the longevity of all the aforementioned connections there are a number of concerns which must be addressed if a connection for a conduit is to be used by various people who connect specific conduit systems to fittings. These concerns and their solutions are listed as follows:

1. The connection must cover a wide range of hoses and tubes:
    a. There are different mechanical properties of hoses and tubes that are used.
    b. These differing properties lead to approaches that work for a particular set of properties, and do not work for other properties.
2. Various solutions that work with these different properties:
    a. Smooth inner portion outer surface, smooth clamp (outer portion) inner surface.
    b. Large footprint to reduce unit loading.
    c. Separation of retention and sealing.
3. Cost of connection factors:
    a. Interior portion, semi rigid tubing, machined, deep drawn, molded plastic, and cast metal (generally), type ends. These types of ends are presently used, and a connection must be amenable to relatively low cost adaptation of them.
    b. Outer portion, machined, cast, molded and deep drawn metal.
    c. Attachment procedure of inner portion.
    d. Attachment procedure of outer portion.
    e. Longevity of connection.
    f. Attacher tools and training.
4. Solutions for these problems:
    a. Simple "Sleeve Lock".
    b. "Sleeve Lock" with a separate sealing means.
    c. A rotatable "Sleeve Lock".
    d. Maintenance of concricity of outer portion to inner portion.
    e. Double included angles.
    f. Quick connection.

These four (4) main categories provide the proper base of consideration for anyone that must connect the hose or tube that fits the mechanical properties that this invention is related to. Unfortunately, even those with years of experience in connecting the hoses or tubes involved, fail to appreciate some of these very important considerations.

Number one (1) on the list above, considers the various types of hose and tubing that is used. A primary factor is the fact that preferably the conduits, such as those consisting of hoses or tubes, involved with this invention contain a polymer. Polymers all share two particular properties: they all move in such a manner to reduce the stress that is imposed on them; and, their mechanical (and chemical) properties are reduced by having too much stress put on them thereby causing deformation.

Some of these polymers themselves are very resistant to the damage that can be caused, but that assumes that the polymeric chain is not broken at an important point. Furthermore, it is often overlooked that almost all polymers that are made into a final shape and have additives in them which are also subject to these effects thereby causing the loss of these properties.

Continuing with number one (1), those holes and tubes covered by this invention are preferably expandable in diameter sufficiently to be useful for the solutions that are described herein, and their interior must be smooth enough to seal.

The expansion of diameter that is required, is sufficient to allow the angles of what is called "Sleeve Lock" to properly operate. Therefore, the length of the fitting interior portion that is permitted by various packaging restrictions is important. In general the smaller the angle, the better "Sleeve Lock" will work, until the reverse taper angle is so small that the thinning of the hose or tube wall starts to require too much movement of the outer locking sleeve along the axis of the connection. But, factors that have to do with how deformable the hose or tubing is, play a very important role in the retention of the hose or tubing to the interior portion of the fitting that is positioned into the hose or tube. Hoses and tubes vary considerably in this deformability respect. This factor also affects the direct sealing of a hose or tube to the fitting interior portion.

Referring now to number two (2) of the list above, there are several factors that can be recognized as important to any solution to the problems that today are common when attaching a hose or tube to some fitting. It is important to use a smooth surface to do the retaining. Discontinuities that are not smooth can cause local deformations that will cause over stressing, and breakage of the polymer chains (molecule). This leads to a very rapid breakdown of the mechanical properties and often "killing" the polymer (rubber or plastic), which is a breakdown that is so complete that the polymer is no longer useful for the purpose that was intended. It has to do with what an engineer calls unit loading. When you reduce the unit loading, you distribute the stress (and resulting deformation) to a larger volume of the material, and if successful, post phone the inevitable breakdown until there is a failure in some other part of the device the hose or tube was used on that causes that device to be scrapped or rebuilt. For the above reason, a large footprint is necessary to apply the force that in this case squeezes the polymer against the fitting interior portion. This large footprint reduces the unit loading on any particular volume, if no discontinuity is present, of the material.

Because of the differing deformations of the material of hoses and tubes, some will seal. Some hoses have a reinforcement that permits expansion. Very small expansions of the material that involve a very smooth transition from the normal hose or tube size can be used, but to avoid a radical transition (from a stress standpoint) and still get sealing, a separate seal must be used.

Referring to number three (3) of the list above, cost, in one or more areas of an installed connection of hose or tubing has caused the idea to not be adopted by those who must actually connect the hose or tube. A little thought discloses that these connectors do not generally actually live with the connection. In other words, first, will the connection be pressure tight and have a lifetime sufficient to sell the device that the connection was used on? Second, how much is it necessary to pay for such a connection? Therefore, the processes that are involved with the manufacturing, and connecting, are very important to the actual adoption of an idea (no matter how good, from a performance standpoint). Therefore the adaptability of the idea to real world situations can be of primary importance. The idea must be easily adapted to systems that the connector is already using, and the idea must permit the connector to go back to the method presently used, if the idea fails for that connector in any way.

To be broadly acceptable, the idea must be expressible in, machined, cast, molded (usually plastic), and deep drawn metal, parts for the interior fitting portion, as well as the exterior (clamping) fitting portion. This idea (in fact all clamping of this nature) preferably the use of plastic to perform the clamping function, the much lower elongation of metal (at these stress levels) determines that metal should be used for the function. Fortunately deep drawn metals serve as the clamping sleeve for "Sleeve Lock", and this process yields these parts at approximately the same cost as plastic, but with a much lower tooling bill. To compare in cost with the presently used methods of attaching a hose or tube is of the utmost importance. The total cost of making this attachment also includes the attachment procedure for the installation of the interior fitting portion, the attachment procedure required for the outer fitting portion (the locking sleeve in this invention), the labor, and training of the labor involved, and the tooling involved with the manufacture, and connection of the idea.

Today, manufactures of devices are again recognizing that the longevity of the device they sell is important to the future sales by the manufacturer. For this reason, some manufacturers of devices will pay a premium for a connection method that will increase the longevity of the system those connections are used in.

Since this method and apparatus for making connections of hose and tubes is preferably directed at a method for minimizing the damage (killing) to the polymer of the hose or tube, the method does increase the longevity of those hoses and tubes. This longevity increase, and the selection of which idea disclosed herein, does depend on the amount of non-connector stress that can exist in the conduit system that leads to, and from, the connection. For example, the idea of the "Rotating Sleeve Lock", where the hose or tube can actually swivel relative to a fixed interior fitting portion enhances the longevity of hoses and tubes used in the most demanding of systems. Considering the labor aspect of the total cost, it is found that features of a "Sleeve Lock" type of connection which do not recognize the labor aspect can fail to be adopted because they are unreliable and it takes too much time to start an outer locking sleeve which must be installed over the interior fitting portion before a hose or tube is connected over a hose or tube.

An idea that is a part of this invention is to have a split ring, which acts between the interior fitting portion and the outer locking sleeve, and maintains the concentricity of parts, locks the outer sleeve on to the interior fitting portion, and forms an entry area for the hose or tube, and provides for visual inspection of the finished connection by the appearance of the ring and some hose or tubing outside of the installed locking sleeve. It is apparent that this ring saves labor time much in excess of its installed cost and provides and additional confirmation for inspecting visually the finished connection. More features, which represent this invention will be discussed in the following section.

Referring to number four (4) of the list above, solutions to the problem outlined above are presented.

4a. Simple Sleeve Lock:

A simple "Sleeve Lock" (part of this invention) consists of a reverse taper (to the hose or tube pull off direction), and a matching reverse taper in an outer member which assembles over a hose or tube. The hose or tube is squeezed between the interior of the hose or tube and the outer member.

The inventors of previous patents of this nature appear to not have recognized the fact that the less the angle, the better the locking. In this patent the inventor recognized that because the hose or tube is expanded in diameter from its normal diameter, that the wall thickness in this expanded area is slightly less than its normal wall thickness, This fact coupled with the desire to have as low a unit force as practically possible, is evidenced by the outer sleeve having a smaller angle of the reverse taper than the interior fitting portion.

4b. "Sleeve Lock" with separate sealing means:

This is not shown by any other previous patents. This concept also is derived from the desire to make a connection that minimizes unit force, and that to always seal, some means that is separate from the "Simple Sleeve Lock" may be necessary. Why? because only in the case where the hose or tube was so soft and deformable, and the outer sleeve maintained sufficient squeeze on the material to insure a seal, did the "Simple Sleeve Lock" perform. This did not allow any rearward travel of the hose or tube that would result in a loss of this minimum squeeze, and less deformable hose or tube material required more than hand applied force to accomplish the required squeeze amount to seal.

4c. A Rotatable "Sleeve Lock":

This concept is not shown on any other authors prior art. It was recognized that some of the unit force away from, and next to the connection could be lessened by allowing the hose to rotate on a fixed (i.e., non-rotating) interior fitting portion. A separate seal is required because no seal could reliably and inexpensively seal the rotating and fixed interior fitting member. To separate the sealing and retention is required to inexpensively provide this most desirable feature of a "Sleeve Lock".

4d. Maintenance of Concentricity of Outer Portion to Inner Portion:

This is also a part of the present invention. The desirability of this improvement is discussed above in the section three (3) discussion of labor costs.

4e. Double Included Angles:

This is also a part of the invention. Earlier patents showed a chamfer on the outer sleeve, and some of the authors work showed a lead into the hose or tube on the interior fitting portion. It was recognized that to make the connection foolproof and lower labor costs that the connection should actually have a lead-on, and a lead-in. This means that you end up with a pair of double included angles. Each double included angle consists of the angle of the reverse taper, plus the angle of the hose or tube entry. The angle of this entry can vary by the type of hose or tube being connected. The smallest diameter of the interior fitting portion should be less than the normal interior diameter of the hose or tube being connected, and the largest diameter of the entry to the outer locking sleeve should be larger than the largest outside diameter of the expanded hose or tube. It is possible in some cases to merely extend the reverse taper angle of the outer locking sleeve so that it is over the entry portion of the interior fitting portion, but that does not alter the function of a "Double Included Angle".

4f. Quick Connection:

This concept or idea is also a part of the invention. The idea is that with the concentricity ring it is possible to always assure that the outer locking sleeve is pushed far enough on to the hose or tube to always have retention. But, to assure that the outer sleeve is always pushed far enough onto the hose or tube to reduce the amount of axial translation of the hose or tube during pull-off, a spring is added, that pushes the outer locking sleeve further onto the hose or tube. Separate sealing is almost always used, but if the "Sleeve Lock" is non-rotating, and the hose or tube is soft enough to seal under the squeeze provided by a small reverse taper angle, and the spring urging the outer locking sleeve up and onto the hose or tube, then a separate sealing means is not required.

The idea makes it possible to just push a hose or tube onto the fitting, and have the hose or tube push the concentric ring through the outer locking sleeve, and have the spring that urges the outer locking sleeve up on the hose or tube, expose the concentricity ring and the end portion of the hose or tube on the outside of the small end of the outer locking sleeve, and have it possible to visually inspect the connection, and be certain that the connection is properly installed or made.

The spring urged outer locking sleeve also provides a means to keep the outer locking sleeve pushed on the hose or tube to an extent that corrects for the slight thinning of the wall of the hose or tube in response to the low unit load that is applied to the hose or tube wall by the outer locking sleeve. The time period required is of the order of many years for this to occur because of low unit force, but if separate sealing is no employed, the time required to lose the sealing of a hose or tube without the separate sealing means is much less. Before a description of the drawing that are included with this patent, a further discussion is included.

Earlier in this patent the killing of the polymer was discussed. It is easy to find cases in current methodology where this has taken place. It is just as easy to find this "killed" polymer in areas that seemed to be areas of much less stress on the polymer. The thing that most overlook is that these areas of seemingly low stress are progressively stressed more and more as they attempt to carry the stresses that are put on to them by the already "killed" polymer is this; the "killing losses suffered by the material that has been "killed" are primarily losses in the tensile or stretching or deforming properties, the material is still incompressible, and that can be found to account for the high stress on "unkilled" material.

While the above, description constitutes preferred embodiments of the invention, it will be appreciated that the invention is susceptible to modification, variation, and change without departing from the proper scope or fair meaning of the accompanying claims.

What I claim is:

1. A conduit coupling for terminating the end portion of a conduct including a deformable hose or tube member, comprising:

a fluid fitting having forward and rearward end portions insertable interiorly of the end portion of said conduit to expand the end portion of said conduit;

a locking sleeve locatable over the forward end portion of said fluid fitting and forming an annular chamber therebetween to receive the end portion of the conduit when inserted therein and clampingly secure the inserted end portion between the fitting and the sleeve; and a centering mechanism for at least temporarily securing said fluid fitting and said locking sleeve in centered relation to each other, said centering mechanism including a resilient spring ring releasably gripping the exterior surface of the fluid fitting in an intermediate position of said end portions and in said intermediate position releasably engaging the interior wall of the locking sleeve to center and at least temporarily secure the sleeve to the fitting for enabling the conduit to be passed onto the fitting.

2. The invention as claimed in claim 1, wherein said resilient spring having an inner surface releasably gripping the exterior surface of the fluid fitting at selected axial locations and an outer surface dimensioned to releasably engage the interior wall of the locking sleeve when the spring ring is adjacent the forward end portion to at least temporarily secure the locking sleeve in spaced centered relation to the fluid fitting.

3. The invention as claimed in claim 2, wherein said locking sleeve and the rearward end portion of said fluid fitting are constructed such that each is formed with a matching frusto-conical surface defined by a double included angle, the frusto-conical surfaces increasing in diameter toward the inserting end of the fluid fitting with the double inclined angle of the locking sleeve being less than the double included angle of the fluid fitting.

4. The invention as claimed in claim 3, wherein the outer surface of said spring ring and the interior wall of said locking sleeve are dimensioned to permit the spring ring to be forced rearwardly and released from engagement with the locking sleeve by the forward end of said conduit, through said annular chamber and outwardly of the rearward end of said locking sleeve whereby to provide a visual indication that the conduit has been coupled to the fitting.

5. The invention as claimed in claim 3, further including sealing means, located rearwardly of said entry, for providing a 360° sealing engagement between and around the outer surface of said fluid fitting and the inner wall of said conduit.

6. The invention as claimed in claim 5, wherein:

said sealing means includes a seal member separate and apart from said conduit, said fluid fitting and said locking sleeve; and said fluid fitting includes a radial inward annular channel sized to receive and position said seal member adjacent to said entry, the depth of said channel being such that said seal member projects above the exterior surface of said fluid fitting to be compressed by and sealingly engage with the inner wall of said conduit.

7. The invention as claimed in claim 6, wherein said seal member comprises an O-ring comprised of a compressible elastomeric material.

8. The invention as claimed in claim 1, wherein said fluid fitting and said locking sleeve comprise tubular members each having a smooth uninterrupted surface to contact directly with the respective inner and outer walls of said conduit and form a sealing engagement therewith.

9. The invention as claimed in claim 1, wherein:

a transition is formed between the forward and rearward end portions of said fitting;

said spring ring is contactible and is axially movable in the annular chamber formed between the sleeve and the fitting and towards said transition; and said spring ring having inner and outer surfaces with the outer surface engaging the inner surface of the locking sleeve and the inner surface gripping the outer surface of the fitting when the spring ring is adjacent to said transition.

10. The invention as claimed in claim 9 wherein said spring ring is normally disposed in engagement with the outer surface of the fluid fitting and adapted to expand radially, as movement of said spring ring towards said transition occurs, substantially simultaneously the outer surface of said spring ring expands radially to maintain engagement with the inner surface of said locking sleeve.

11. The invention as claimed in claim 1, wherein:
a transition is formed between the forward and rearward end portions of said fluid fitting;
said spring ring is contactible and is mounted to the outer surface of said fluid fitting, said spring ring being adapted to temporarily grip the exterior surface of and be moved between the opposite ends of said rearward end portion; and
said spring ring expanding radially into releasable engagement with the inner wall of said locking sleeve when the spring ring is located on the fitting.

12. The invention as claimed in claim 11, wherein the forward end portion of said fluid fitting forms a radially inwardly converging frusto-conical lead on area for initial insertion of the conduit into the annular chamber.

13. The invention as claimed in claim 12, wherein the forward end portion of said locking sleeve forms a radially outwardly opening frusto-conical lead in area for initial insertion of the conduit into the annular chamber, said lead in and said lead on forming an annular V-shaped throat.

14. The invention as claimed in claim 11, wherein:
said fluid fitting further includes an outwardly open annular channel; and further comprising:
a seal member disposed in said annular channel for engagement with the inner wall of the conduit and forming a sealing engagement therewith.

15. The invention as claimed in claim 14, wherein said spring ring is located adjacent to said annular channel for at least temporarily holding the locking sleeve in centered relation to said fluid fitting.

16. The invention as claimed in claim 1, wherein said fluid fitting comprises:
a fluid conduit having a generally cylindrical first portion extending between first and second ends arranged on a central longitudinal axis and including said forward end portion;
said first end forming a radial shoulder, and said second end forming the rearward end of said rearward end portion; and
said forward end portion extending forwardly of said first end and converging radially inwardly to form a frusto-conical lead on which is insertable interiorly of the end portion of said conduit whereby to expand the diameter of said conduit; and
a mounting sleeve rotatably mounted between said first and second ends and adapted to simultaneously mount and seal the inner wall of said conduit, the exterior surface of said mounting sleeve forming a frusto-conical surface which increases in diameter and has its largest diameter adjacent to said radial shoulder.

17. The invention as claimed in claim 16, wherein:
said mounting sleeve includes a first and second radially inwardly directed flange adjacent the respective first and second ends of said cylindrical first portion for supporting the mounting sleeve for rotation relative thereto.

18. The invention as claimed in claim 16, further comprising:
a first flange of said fitting and said radial shoulder form an annular recess; and
a resilient elastomeric seal located in said annular recess to form a 360° seal between the conduit and the fluid fitting whereby to axially seal the conduit relative to the fluid fitting.

19. The invention as claimed in claim 1, wherein said locking sleeve includes an outwardly directed radial shoulder;
said fluid fitting includes an endwall at the rearward end of its rearward end portion; and
a spring having opposite ends, respectively, acting against said rearward end and said radial shoulder for forcing the locking sleeve towards the forward end portion of said fluid fitting.

20. A conduit coupling for terminating the end portion of a deformable conduit comprising:
a tubular fluid fitting having forward and rearward end portions arranged on a central longitudinal axis and forming a shoulder which is insertable interiorly of the end portion of a conduit to expand the diameter of said conduit, said conduit being rotatably mounted to said fitting, said rotatable mounting comprises a mounting sleeve having a pair of radially inwardly directed flanges for supporting the mounting sleeve for rotation on said fluid fitting;
a seal located rearwardly of said shoulder for sealing between the inner wall of the conduit and the outer periphery of the fitting when the inserted end is mounted to said fitting;
a tubular locking sleeve, locatable over said seal and forming an annular chamber therewith, for receiving the end portion of the conduit when the fluid fitting is inserted into the conduit and clampingly securing the inserted end portion of the hose between said rotatable mounting and said locking sleeve; and
a centering mechanism movable relative to the first and second end portions of said fitting for at least temporarily securing said fluid fitting and said locking sleeve in centered relation at the forward end of the annular chamber for receiving the forward end portion of the conduit, said centering mechanism including a resilient spring ring releasably gripping the exterior surface of the fluid fitting in an intermediate position and in said intermediate position releasably engaging the interior wall of the locking sleeve to center and at least temporarily secure the sleeve to the fitting for enabling the deformable conduit to be passed onto the fitting.

21. The invention as claimed in claim 20, wherein:
said mounting sleeve and said locking sleeve are generally frusto-conical each having a double included angle disposed symmetrically relative to the longitudinal axis; and
said locking sleeve is rotatable about said mounting sleeve and the double included angle of said locking sleeve is less than the double included angle of said mounting sleeve, the largest diameter portion of said mounting sleeve being adjacent to said shoulder.

22. The invention as claimed in claim 21, wherein:
one of said radial flanges is adjacent to said shoulder and forms an outwardly opening annular recess therewith; and said seal comprises an annular O-ring of compressible elastomeric material located in said annular recess.

23. The invention as claimed in claim 21, wherein said centering mechanism comprises a radially expandable and contractible spring ring, said spring ring engaging the inner wall of said locking sleeve and the outer surface of the fluid fitting when the spring ring is located adjacent to said shoulder of said fluid fitting.

24. The invention as claimed in claim 23, wherein said spring ring is mounted to the outer periphery of said fluid fitting and adapted to be in continuous temporary gripping engagement with said fluid fitting when moving between the opposite ends of said rearward end portion.

25. The invention as claimed in claim 20, wherein:
the rearward end portion of said fluid fitting comprises a support sleeve and said mounting sleeve;
the forward end portion of said fluid fitting forms a frusto-conical lead on to said support sleeve; and
said mounting sleeve is rotatably mounted to said support sleeve.

26. The invention as claimed in claim 25, wherein:
said support sleeve is generally cylindrical and of substantially uniform diameter;
said lead on cooperating with one of said radial flanges to form an annular recess; and
said seal comprises a seal member in said annular recess, said seal member providing a 360° sealing engagement between and around the outer surface of said fluid fitting and the inner wall of said conduit.

27. A conduit coupling for terminating the end portion of a deformable conduit member, comprising:
a fitting having forward and rearward end portions, the forward end portion being adapted to be inserted interiorly of the end portion of said conduit whereby to expand said end portion;
a locking sleeve locatable over the fitting and movable between first and second positions relative to the fitting, the sleeve forming an annular chamber around the fitting for receiving the end portion of the conduit when the conduit is inserted therein and when the locking sleeve is in the first position and clampingly securing the inserted end portion against the fluid fitting when the locking sleeve is in the second position;
biasing the locking sleeve into said first position; and
a centering mechanism including a resilient spring ring releasably gripping the exterior surface of the fluid fitting in an intermediate position and in said intermediate position releasably engaging the interior wall of the locking sleeve to center and at least temporarily secure the sleeve to the fitting for enabling the deformable hose to be passed onto the fitting.

28. The invention as claimed in claim 27, wherein:
said locking sleeve includes a radially outwardly directed flange; and
said biasing is achieved by a coil spring having first and second ends, respectively, abutted against said flange and against said fluid fitting.

29. The invention as claimed in claim 27, wherein said locking sleeve and the rearward end portion of said fitting are formed with a matching frusto-conical surface defined by a double included angle, the frusto-conical surfaces increasing in diameter from the rearward end toward the inserting end of the fitting with the double included angle of the sleeve being less than the double included angle of the rearward end portion of the fitting.

30. The invention as claimed in claim 29, further comprising sealing means for sealing about the inner wall of the conduit.

31. The invention as claimed in claim 30, wherein:
said sealing means comprises a seal member; and
said fluid fitting includes an outwardly open radial channel sized to receive said seal member, the depth of said channel being such that the seal member projects above the peripheral surface of the fluid fitting to compress and sealingly engage with the inner wall of the conduit.

32. The invention as claimed in claim 31, wherein said seal member comprises an O-ring comprised of a compressible elastomeric material.

33. The invention as claimed in claim 27, wherein:
the forward and rearward end portions of said fluid fitting are arranged on a central longitudinal axis with a transition between said end portions; and
said spring ring mounted to the outer periphery of the fitting, the spring ring being adapted to grip the fluid fitting adjacent to said transition and engage in the inner wall of the locking sleeve whereby to temporarily retain the sleeve in centered relation relative to the fitting.

34. The invention as claimed in claim 33, wherein said forward end portion forms a frusto-conical lead on area for initial insertion of the conduit into the annular chamber.

35. The invention as claimed in claim 33, wherein said fluid fitting further includes an outwardly open annular groove, and further comprising:
a seal member disposed in said annular groove for engagement with the inner wall of the conduit and forming a sealing engagement therewith.

36. In a conduit coupling of the type including a fluid fitting of bi-conical shape for insertion into a terminable end portion of a conduit, said fitting having frusto-conical forward and rearward end portions arranged on a central longitudinal axis with said rearward end portion being adapted to engage the inner wall of the conduit, and a locking sleeve locatable about said rearward end portion and adapted to engage the outer wall of the conduit, the improvement comprising:
the forward end portion of said fluid fitting converging radially inwardly and forming a lead on for the end portion of said conduit;
the forward end portion of said sleeve being frusto-conical and opening radially outwardly to form a lead in for the end portion of said conduit;
said forward end portions cooperating to define an annular V-shaped entry throat to direct the end portion of the hose into an axially extending annular chamber formed between the sleeve and the rearward end portion of the fitting; and
centering means for temporarily securing said fluid fitting and said locking sleeve in centered relation relative to said central longitudinal axis, said centering means including a resilient spring ring releasably gripping the exterior surface of the fluid fitting in an intermediate position and in said intermediate position releasably engaging the interior wall of the locking sleeve to center and at least temporarily secure the sleeve to the fitting for enabling the conduit to be passed onto the fitting.

37. The invention as claimed in claim 36, wherein the angle of said "V" is between 60° and 100°.

38. The invention as claimed in claim 36, wherein said centering means includes a radially expandable and contractible spring ring having outer and inner surfaces engageable respectively, with the inner and outer surfaces of the sleeve and the fitting, said spring ring being movable axially between the ends of said sleeve and locatable adjacent to said lead on whereby to temporarily hold the sleeve and the fitting in centered relation.

39. The invention as claimed in claim 36, wherein:

an annular crest is formed between the forward and rearward end portion of said fitting; and said centering means comprises a radially expandable and contractible spring ring movable axially between the ends of said sleeve and towards said crest;

said spring ring having an outer surface adapted to engage the inner surface of the sleeve and an inner surface adapted to engage the outer surface of the fitting when the spring ring is adjacent to said crest.

40. A method of coupling the free end portion of a semi-rigid conduit having an axial bore with an insertable end of a fluid fitting whereby fluid may be conveyed therethrough in a fluid-tight relationship, the steps of the method comprising:

(a) locating a locking sleeve about the exterior surface of the fluid fitting for movement between a first position adjacent to the insertable end and a second position;

(b) at least temporarily securing a resilient radially expandable and contractible spring ring on the fitting adjacent to the insertable end; and (c) positioning the inner wall of the locking sleeve relative to the insertable end;

(d) said spring ring gripping the exterior surface of the fitting in an intermediate position and in said intermediate position said spring ring releasably engaging said locking sleeve for establishing sufficient concentricity between the locking sleeve and the fluid fitting and forming a throat sufficient for the conduit to enter for securing the conduit to the fitting.

41. The method as claimed in claim 40, further comprising the steps of:

forcing said fluid fitting into the bore of the conduit and the end of the conduit into the throat;

said forcing being continued whereby to force the conduit end against said spring ring and said spring axially rearwardly through the locking sleeve and from the locking sleeve whereby to be visible and in said second position;

the inner wall of the locking sleeve and the outer wall of the fluid fitting being simultaneously brought into compressive gripping and sealing relation about the conduit.

42. The method as claimed in claim 40, further comprising the step of locating a seal member in said first position to form a seal between the inner wall of the conduit and the outer surface of the fitting.

\* \* \* \* \*

UNITED STATES PATENT AND TRADEMARK OFFICE
CERTIFICATE OF CORRECTION

PATENT NO. : 5,868,435
DATED : February 9, 1999
INVENTOR(S) : Donald D. Bartholomew It is certified that error appears in the above-identified patent and that said Letters Patent is hereby corrected as shown below:

Column 2:
Line 13, delete "is";

Column 3:
Line 10, "Lead-on" should be --lead-on--
Line 16, "Separate" should be --separate--
Line 48, "Fitting" should be --fitting--

Column 5:
Line 59, delete " have may" and substitute --may have-- therefor

Column 7:
Line 64, delete "a" and substitute --an-- therefor

Column 12:
Line 21, "lead on 36" should be --lead on 30--

Column 13:
Line 62, "concricity" should be --concentricity--

Column 14:
Line 21, "holes" should be --hoses--
Line 55, "post phone" should be --postpone--

Column 15:
Line 39, "manufactures" should be --manufacturers--

Column 16:
Line 22, "thickness," should be --thickness.--
Line 41, "authors" should be --author's--
Line 57, "authors" should be --author's--

UNITED STATES PATENT AND TRADEMARK OFFICE
CERTIFICATE OF CORRECTION

PATENT NO. : 5,868,435
DATED : February 9, 1999
INVENTOR(S) : Donald D. Bartholomew It is certified that error appears in the above-identified patent and that said Letters Patent is hereby corrected as shown below:

Column 17:
Line 37, delete "no" and substitute --not-- therefor
Line 39, delete "drawing" and substitute --drawings-- therefor
Line 45, delete "most overlook" and substitute --is most overlooked-- therefor
Line 48, delete "to"
Line 49, "this; the "killing losses" should be --this: the "killing losses"--

Column 21:
Line 46, claim 27, "biasing the locking sleeve into said first position;" should be --means for biasing the locking sleeve into said second position;--
Line 53, claim 27, "hose"should be --conduit--
Line 57, claim 28, after "said" insert --means for--

Column 22:
Line 19, claim 33, delete "being adapted to grip" and substitute --gripping-- therefor
Line 20, claim 33, delete "engage" and substitute --engaging-- therefor
Line 29, claim 35, "groove;" should be --groove,--

Column 23:
Line 13, claim 39, delete "being adapted to grip" and substitute --engaging-- therefor
Line 15, claim 39, delete "adapted to grip" and substitute --engaging-- therefor Column 24:
Line 4, claim 40, after "position" insert --of said insertable end--

Signed and Sealed this

Nineteenth Day of June, 2001

*Attest:*

*Attesting Officer*

NICHOLAS P. GODICI
*Acting Director of the United States Patent and Trademark Office*